J. A. McINTOSH.
TRAFFIC SIGNAL.
APPLICATION FILED FEB. 16, 1916.

1,210,336.

Patented Dec. 26, 1916.
2 SHEETS—SHEET 1.

Witnesses
Frederick W. Ely
P. M. Smith

Inventor
J. A. McIntosh.
By Victor J. Evans
Attorney

J. A. McINTOSH.
TRAFFIC SIGNAL.
APPLICATION FILED FEB. 16, 1916.

1,210,336.

Patented Dec. 26, 1916.
2 SHEETS—SHEET 2.

Witnesses
Frederich W. Ely
P. M. Smith

Inventor
J. A. McIntosh.
By Victor J. Evans
Attorney

UNITED STATES PATENT OFFICE.

JAMES A. McINTOSH, OF PORTLAND, OREGON.

TRAFFIC-SIGNAL.

1,210,336.  Specification of Letters Patent.  Patented Dec. 26, 1916.

Application filed February 16, 1916. Serial No. 78,698.

*To all whom it may concern:*

Be it known that I, JAMES A. McINTOSH, a citizen of the United States, residing at Portland, in the county of Multnomah and State of Oregon, have invented new and useful Improvements in Traffic-Signals, of which the following is a specification.

This invention relates to traffic signals especially adapted for use upon automobiles and other motor vehicles, whereby the operator either by day or by night may indicate to those in front and rear of the machine any contemplated change in the direction of the machine equipped with the signaling apparatus.

With the above and other objects in view, the invention consists in the novel construction, combination and arrangement of parts, as herein described, illustrated and claimed.

Figure 1:
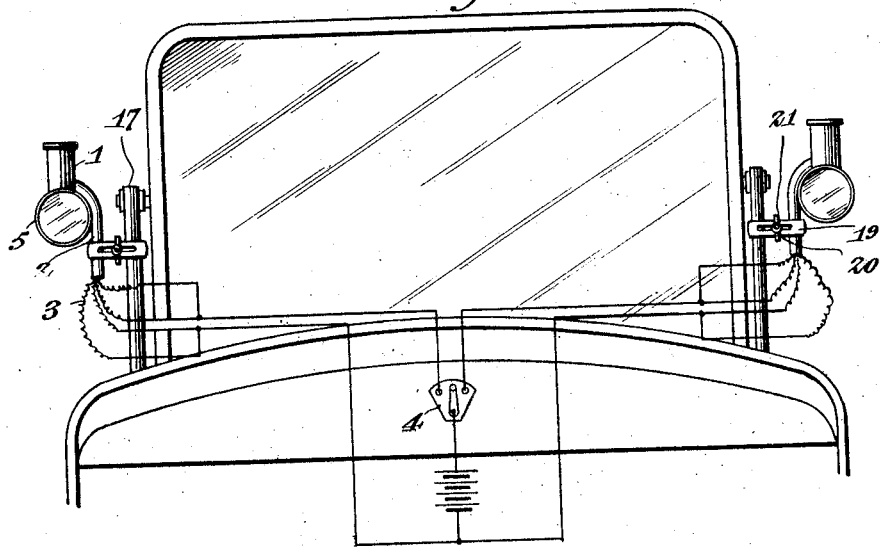
Figure 2:
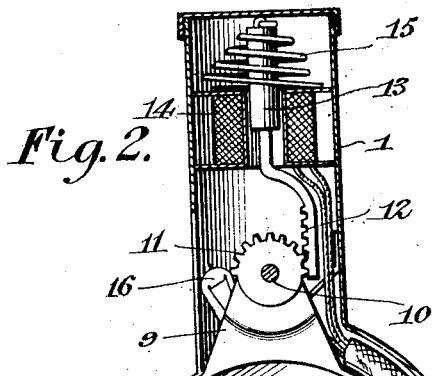
Figure 5:
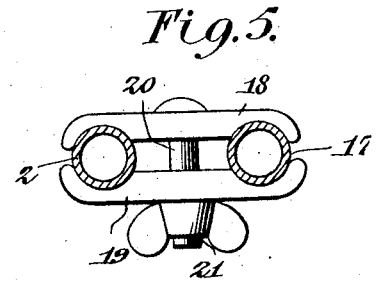
Figure 3:
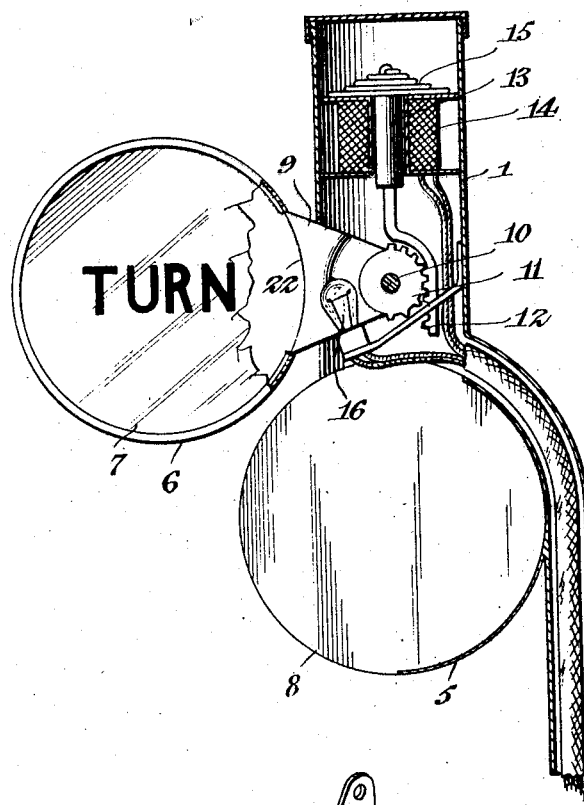
Figure 4:
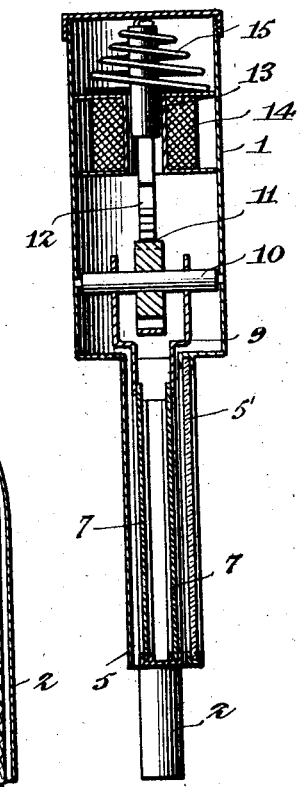
Figure 6:
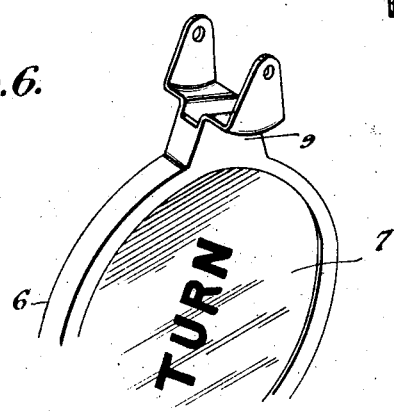

In the accompanying drawings, Figure 1 is a view in elevation of the windshield of an automobile, showing two of the signals of this invention mounted thereon. Fig. 2 is an enlarged vertical section through one of the signals taken in a plane parallel to the windshield and showing the position assumed by the parts when the signaling member is in its housed position. Fig. 3 is a similar view showing the position of the parts when the signaling member is in its exposed position. Fig. 4 is a vertical section taken centrally through the casing at right angles to Figs. 2 and 3. Fig. 5 is a detail view of one of the clamps by means of which the signal is attached to the frame or windshield. Fig. 6 is a detail of one of the signaling members.

In the preferred embodiment of this invention, I employ a casing 1 which is preferably cylindrical, said casing being rigidly and fixedly attached to a support 2 of tubular construction and forming a conduit for the electric wires which energize the lamp and solenoid magnet hereinafter referred to, the group of wires indicated at 3 extending to a common three-point switch 4 located on the steering column or steering wheel of the machine or on the dash or located at any other convenient place.

At the bottom of the casing and on one side of the support therefor is a housing 5 which is disk-shaped and of hollow formation the same being adapted to receive a signaling member 6 which is also disk-shaped and hollow and, in the preferred embodiment of this invention, provided with front and rear panels 7 of transparent or translucent material such as glass and preferably colored to give a warning signal to persons in front and rear of the machine on which the signaling apparatus is mounted.

The housing 5 is fixedly secured and related to the casing 1 and the support 2 and is formed in the periphery thereof with an opening 8 through which the signaling member 6 is adapted to be moved from its housed to its exposed position and vice versa. The signaling member 6 is provided with a hollow triangular-shaped arm 9 which is terminally mounted on a pivot 10 within the casing 1. Said arm is provided with a sector gear face 11 and meshing therewith is a reciprocatory rack bar 12 which is carried by the movable core 13 of a solenoid magnet 14. The core 13 is normally sustained in an elevated position by means of a coiled expansion spring 15 housed in the upper portion of the casing 1, one end of said spring 15 resting on top of the solenoid magnet and the other extremity of said spring being attached to the core 13. The spring exerts an upward pressure on the core 13 and thereby holds the signaling member 6 within its housing 5 and prevents accidental swinging movement of the signaling member 6 in traveling over rough road surfaces.

The arm 9 which is hollow, contains an electric lamp 16 from which the circuit wires lead through the tubular support 2 to the three-point switch 4 above referred to. The post 2 is connected to one of the side bars 17 by means of a two-part clamp designated generally at A and comprising the parallel members 18 and 19 which are recessed in their inner faces to embrace the support 2 and the frame bar 17 as shown, the members 18 and 19 having a clamping bolt 20 inserted therethrough and provided with a thumb nut 21.

It will be understood that two of the signals hereinabove described are preferably mounted on the wind-shield at opposite sides thereof so that the signaling members 6 will project beyond the side lines of the vehicle when moved to their exposed positions. The springs 15 normally hold the signaling members within their respective housings 5.

By turning the switch 4 in one direction, the corresponding solenoid 14 is energized thereby producing a downward movement of the rack bar 12 which by meshing with the sector gear face 11 effects an outward and upward movement of the respective signaling member 6. Either the right or left hand signaling member may thus be operated according to the direction in which the operator of the machine is about to turn. At night time the signaling member 6 is interiorly illuminated by means of the lamp 16, the rays from which are admitted to the interior of the signaling member through an orifice 22 in the periphery thereof and communicating with the space of the hollow arm 9 in which the lamp 16 is placed. Upon moving the switch to neutral position, the magnet 14 is deënergized and thereupon the signaling member returns to its housed position by gravity assisted by the action of the spring 15, the latter serving to maintain the signaling member in its housing and prevent oscillatory movement thereof on rough roads. 5' represents a mirror fastened to the rear side of the housing 5.

Having thus described my invention, I claim:—

In a traffic signal, the combination of a casing, a tubular support for said casing forming a conduit for circuit wires, a housing in the form of a hollow disk-shaped body having a fixed relation to said casing and its support and formed with an opening in the periphery thereof, a movable signaling member in the form of a hollow disk normally concealed in said housing and adapted to be moved outwardly through the peripheral opening of the housing to an exposed position, said signaling member embodying a translucent panel, a hollow arm on said signaling member terminally pivoted in the casing and provided with a sector gear face, and an electrically operated rack bar meshing with said sector gear face, and a lamp contained within said hollow arm for illuminating the interior of said signaling member.

In testimony whereof I affix my signature in presence of two witnesses.

JAMES A. McINTOSH.

Witnesses:
O. C. BORTZMEYER,
H. O. VOGET.